(12) United States Patent
Rischmuller et al.

(10) Patent No.: US 8,473,125 B2
(45) Date of Patent: Jun. 25, 2013

(54) METHOD OF PILOTING A MULTIPLE ROTOR ROTARY-WING DRONE TO FOLLOW A CURVILINEAR TURN

(75) Inventors: Michael Rischmuller, Aix-En-Provence (FR); Frederic D'haeyer, Chelles (FR)

(73) Assignee: Parrot, Paris (FR)

(*) Notice: Subject to any disclaimer, the term of this patent is extended or adjusted under 35 U.S.C. 154(b) by 7 days.

(21) Appl. No.: 13/410,229

(22) Filed: Mar. 1, 2012

(65) Prior Publication Data
US 2012/0232718 A1 Sep. 13, 2012

(30) Foreign Application Priority Data

Mar. 8, 2011 (FR) ...................................... 11 51904

(51) Int. Cl.
*G06F 13/00* (2006.01)
(52) U.S. Cl.
USPC .............................. 701/11; 701/3; 244/17.13
(58) Field of Classification Search
USPC ..................................... 701/3, 11; 244/17.13
See application file for complete search history.

(56) References Cited

U.S. PATENT DOCUMENTS

| | | | | |
|---|---|---|---|---|
| 4,004,756 A | * | 1/1977 | Gerstine et al. | 244/17.13 |
| 4,818,990 A | * | 4/1989 | Fernandes | 340/870.07 |
| 5,240,207 A | * | 8/1993 | Eiband et al. | 244/190 |
| 5,263,662 A | * | 11/1993 | Fowler et al. | 244/17.13 |
| 7,400,950 B2 | * | 7/2008 | Reich | 701/3 |
| 7,551,989 B2 | * | 6/2009 | Knotts et al. | 701/3 |
| 8,214,088 B2 | * | 7/2012 | Lefebure | 701/2 |
| 2002/0142699 A1 | * | 10/2002 | Davis | 446/37 |
| 2004/0245378 A1 | | 12/2004 | Nonami et al. | |
| 2005/0048918 A1 | * | 3/2005 | Frost et al. | 455/41.2 |
| 2009/0284553 A1 | * | 11/2009 | Seydoux | 345/649 |
| 2010/0070105 A1 | * | 3/2010 | Larkin et al. | 701/1 |
| 2011/0049290 A1 | * | 3/2011 | Seydoux et al. | 244/17.13 |
| 2012/0091260 A1 | * | 4/2012 | Callou | 244/17.13 |
| 2012/0158215 A1 | * | 6/2012 | Sun et al. | 701/3 |
| 2012/0241553 A1 | * | 9/2012 | Wilke | 244/17.13 |

FOREIGN PATENT DOCUMENTS

| | | |
|---|---|---|
| FR | 2927262 A1 | 8/2009 |
| JP | 2006312344 A | 11/2006 |
| WO | 2010061099 A2 | 6/2010 |

\* cited by examiner

*Primary Examiner* — Charles A Fox
*Assistant Examiner* — Rebecca Wagner
(74) *Attorney, Agent, or Firm* — Haverstock & Owens LLP

(57) ABSTRACT

The respective motors of the drone (10) can be controlled to rotate at different speeds in order to pilot the drone both in attitude and speed. A remote control appliance produces a command to turn along a curvilinear path, this command comprising a left or right turning direction parameter and a parameter that defines the radius of curvature of the turn. The drone receives said command and acquires instantaneous measurements of linear velocity components, of angles of inclination, and of angular speeds of the drone. On the basis of the received command and the acquired measurements, setpoint values are generated for a control loop for controlling motors of the drone, these setpoint values controlling horizontal linear speed and inclination of the drone relative to a frame of reference associated with the ground so as to cause the drone to follow curvilinear path (C) at predetermined tangential speed (u).

13 Claims, 3 Drawing Sheets

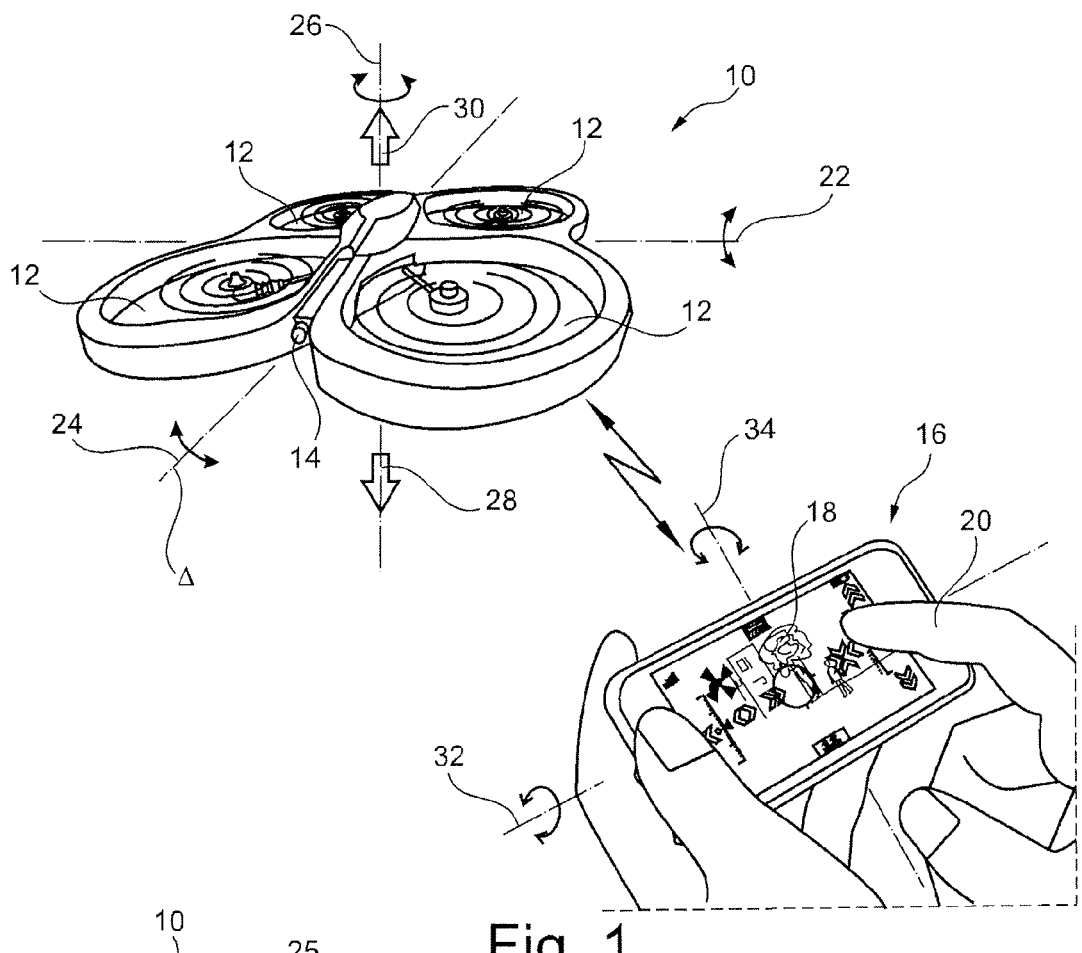
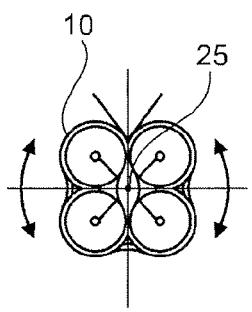
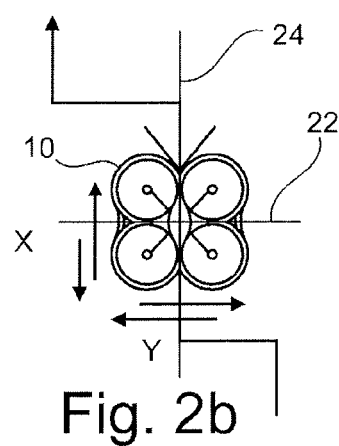
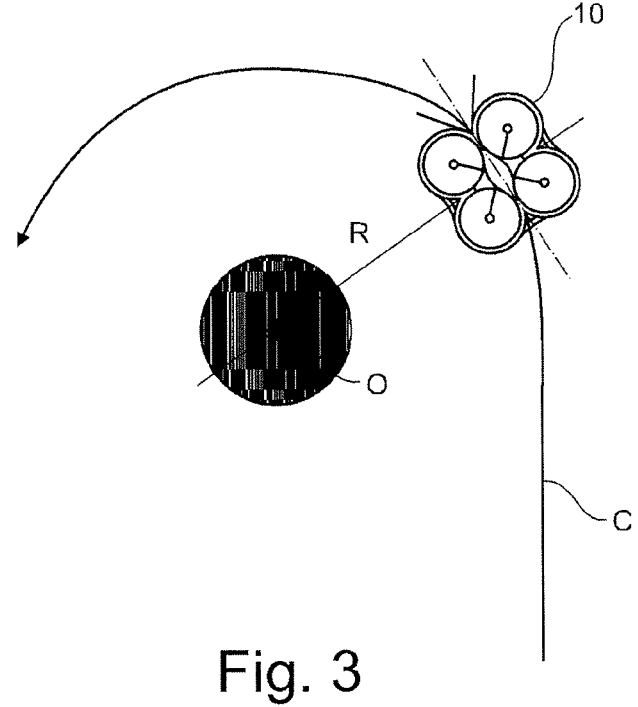
Fig. 1
Fig. 2a
Fig. 2b
Fig. 3

METHOD OF PILOTING A MULTIPLE ROTOR ROTARY-WING DRONE TO FOLLOW A CURVILINEAR TURN

FIELD OF THE INVENTION

The invention relates to piloting rotary wing drones such as quadricopters or the like.

Such drones are provided with multiple rotors driven by respective motors that can be controlled to rotate at different speeds in order to pilot the drone both in attitude and in speed.

A typical example of such a drone is the AR. Drone from Parrot SA, Paris, France, which is a quadricopter fitted with a series of sensors (three-axis gyros, accelerometers, and altimeter). The drone is also provided with a front camera picking up an image of the scene to which the drone is directed, and a vertically-directed camera picking up an image of the terrain being overflown.

The drone is piloted by a user making use of a remote control device that is separate from the drone,—referred to below as an "appliance"—and that is connected to the drone via a radio link.

BACKGROUND OF THE INVENTION

WO 2010/061099 A2 (Parrot SA) describes in particular one such drone and how it can be piloted by means of a multimedia player or telephone having a touch screen and an incorporated accelerometer, e.g. a cell phone of the iPhone type, or a multimedia player or tablet of the iPod Touch or iPad type (trademarks registered by Apple Inc., USA). Those appliances include the various control members needed for detecting piloting commands and for bidirectional exchange of data with the drone via a wireless link of the WiFi (IEEE 802.11) or Bluetooth (registered trademarks) local network type. In particular, the appliance is provided with a touch screen that displays the image picked up by the front camera, and superposed thereon various symbols that enable commands to be activated merely by the user making contact with a digit on the touch screen. This display also makes "immersed" piloting possible in which the user does not pilot the drone by looking at the drone itself, but rather makes use of the camera image as though the pilot were on board the drone.

The drone may be used for racing games that consist in following a path that is defined like a slalom by single or double gates or posts, and by a finish line. WO 2008/056049 A1 (Parrot) describes such a quadricopter racing game that consists in going round the circuit defined by pylons and by two virtual rings through which the player must cause the quadricopter to pass.

In order to win the race, it is essential to go fast. And in order to save time, it is necessary to turn around the posts as closely as possible while conserving a maximum amount of kinetic energy, i.e. while traveling relatively fast.

The same applies if the game involves about-turn maneuvers, figures-of-eight, etc.

With present quadricopters, these maneuvers require the user to be skilled and experienced because the mode of piloting requires the user to use several different controls in combination in order to perform these figures.

More precisely, the drone is piloted directly by the user by means of the following in combination:

firstly signals delivered by the inclination detector of the appliance: for example in order to cause the drone to move forwards the user inclines the appliance about the corresponding pitching axis, and in order to cause the drone to shift to right or to left the user inclines the same appliance relative to its roll axis; and secondly controls that are available on the touch screen, in particular an "up/down" control (corresponding to a throttle control) and a "turn right/left" control (causing the drone to pivot about a yaw axis).

Thus, if the motors are controlled in such a manner as to cause the drone to tilt or "dive" downwards (to be inclined with a pitching angle), then the drone will move forwards at a speed that increases with increasing angle of inclination; conversely, if the drone takes a "nose-up" position (in the opposite direction), its speed will progressively slow down and reverse, accelerating in the opposite direction. Likewise, an inclination about the roll axis (the drone tilting to right or to left) will give rise to linear movement of the drone in horizontal translation to the right or the left.

This type of horizontal speed control in the forward/backward and left/right directions obtained solely by acting on the speeds of rotation of the four motors is characteristic of a quadricopter.

This differs in particular from speed control systems for other types of aircraft (airplane, single- or dual-rotor helicopter) such as those described for example in JP 2006/312344 A or US 2004/245378 A1, which implement servo-mechanisms for mechanically controlling the positions of ailerons or rudder control surfaces, or for controlling the cyclic pitch of a helicopter rotor in order to modify the angle of incidence of blades so as to enable a horizontal speed component to be created.

The drone described in above-mentioned WO 2010/061099 A2 is also provided with a command for taking up a stationary point (automatic stabilization): when the user lets go of all of the controls on the remote control appliance, the drone stops moving and stays in a stationary point in a manner that is entirely automatic.

Using the available controls, the user can control the path followed by the drone by combining i) movements in XY translation (forward/backward and left/right) by controlling the inclination of the drone about its pitching and roll axes, and ii) movements in pivoting by controlled turning of the drone about its yaw axis. In this discussion, altitude control (up/down) is ignored, and it is assumed that the drone follows its path at constant altitude.

These two types of movement (in XY translation and in pivoting) may be performed simultaneously, but doing so requires a certain amount of skill. A novice will tend to separate the controls by: applying XY piloting to the drone using a left thumb and tilting the appliance; and then letting the drone take up a stationary position by letting go with the thumb; then using the turning control by moving a right finger in order to change direction (thereby turning the XY frame of reference associated with the drone); and then continuing XY piloting in this new direction, etc.

This first method of operation (with controls that are dissociated) does not enable the drone to be piloted quickly.

Another technique consists in piloting the drone in XY mode only along the set path. However under circumstances the front camera in the drone no longer points in the forward direction of the drone, and the visual feedback on the screen of the appliance cannot be used for piloting purposes.

In any event, even when piloting with simultaneous and combined controls, a fast tight turn gives rise to a non-negligible amount of centrifugal force that even an experienced user finds practically impossible to perceive and compensate once the speed exceeds a certain level, thus giving rise to a significant rise of side-slip or of oversteer of the drone with a consequence departure from the path of the race track.

In order to make a turn with combined controls, the user needs to control three degrees of freedom of the appliance simultaneously: pressing a left thumb on the screen while tilting the appliance about its two axes (for controlling the drone in roll and in pitching), while also moving a right finger sideways (for yaw control of the drone)—and while ignoring any up/down control.

OBJECT AND SUMMARY OF THE INVENTION

One of the objects of the invention is to provide a solution to this series of difficulties by proposing a novel mode of controlling the drone that enables it to be flown over typical turning paths of a race track:
around sharp curves at high speed;
while compensating for any risk of side-slip or oversteer by appropriately controlling the inclination of the drone (banking like a motorcycle while turning); and
while keeping the front camera pointing in the travel direction of the drone at all times.

Another object of the invention is to make available to the user such a mode of piloting—referred to below as "combined yaw mode of piloting"—in which it is possible simultaneously:
to switch into this particular mode by a simple operation; and
to reduce the number of degrees of freedom that the user needs to control in comparison with piloting with a combination of controls;
while conserving possibilities for taking fine action on the attitude of the drone, its altitude, etc.

The invention provides a method of piloting of the type disclosed in particular in about-mentioned JP 2006/312344 A or US 2004/245378 A1, i.e. comprising the following steps:

a) a remote control appliance producing a turning command to follow a curvilinear path;

b) the drone both i) receiving said command and ii) acquiring instantaneous measurements of the linear velocity components, of the angles of inclination, and of the angular velocities of the drone; and c) on the basis of the received command and of the measurements acquired in step b), generating setpoint values for a drone control loop, these setpoint values controlling the horizontal linear speed and the inclination of the drone relative to a frame of reference associated with the ground so as to make the drone follow said curvilinear path with a predetermined tangential speed.

Nevertheless, JP 2006/312344 A and US 2004/245378 A1 both disclose automatic flight control systems in which the aircraft (a single-rotor helicopter) is piloted so as to follow a predetermined target path by position servo-control, with the path actually followed being compared with the setpoint path.

The invention proposes another type of flight parameter control that is specific to a drone of the quadricopter type, in which the user acts in real time to control a single parameter, referred to as the "rate of turn", which parameter is essentially associated with the greater or smaller radius of the circular path.

The drone is then piloted in a manner that is similar to riding a motorbike, where in order to make a turn and follow its curve the rider tilts the vehicle to a greater or lesser extent and varies the angle of inclination in real time.

In a more complete version, the user is also given control over the speed at which the drone travels along this circular path, i.e. the user is given a second degree of freedom.

In the above analogy, this corresponds to the ability of a motorbike rider to increase or reduce the throttle while making a turn.

More precisely, and in characteristic manner, the invention provides a method in which: the drone is a drone of the quadricopter type having multiple rotors driven by respective motors; the control loop controls the horizontal linear speed and the inclination of the drone by taking different actions on the speeds of rotation of said motors; and said command is a rate of turn command comprising a right or left turn direction parameter and a parameter defining a setpoint for the instantaneous radius of curvature of the turn.

The curvilinear path may be a circular path, that is followed at a constant radius of curvature, and the predetermined tangential speed may be a constant speed.

Preferably, the setpoint values generated in step c) control the motors of the drone in such a manner as to ensure that the altitude of the drone is kept constant relative to the ground.

Very advantageously, the setpoint values generated in step c) control the horizontal linear speed and the inclination of the drone in such a manner as to maintain the drone at a zero radial speed relative to the circular path, so as to compensate for any side-slip or oversteer of the drone as it follows said path.

The turning command may be produced in particular by a remote control appliance comprising: a touch screen; means suitable for i) detecting contact of at least one digit of a user on the surface of the screen, ii) determining the position of the point(s) of contact, and iii) producing corresponding piloting commands including the command to turn along a curvilinear path; and wireless data transmission means suitable for transmitting commands to the drone.

Under such circumstances, the command to turn along a curvilinear path is advantageously triggered on detecting simultaneous contact of two of the user's digits on the touch screen, with the command being produced throughout the duration of the simultaneous contact with two digits, and until loss of this simultaneous contact is detected.

Furthermore, if the remote control appliance further includes a detector of inclinations about one and/or both of its pitching and/or roll axes, and the command for turning along a curvilinear path is advantageously produced i) as a function of the left or right direction of the inclination of the appliance relative to its roll axis in order to determine the left or right turn direction parameter, and ii) as a function of the amplitude of the inclination of the appliance relative to its roll axis in order to determine the parameter defining the radius of curvature of the turn.

The turning command may also be produced as a function of the amplitude of the inclination of the appliance relative to its pitching axis, in order to determine a tangential speed parameter.

Advantageously, if the path followed during a command to turn along a curvilinear path includes a radial velocity component, then the turn command is also produced as a function of the amplitude of the inclination of the drone relative to its pitching axis so as to cancel this radial velocity component.

In any event, provision may be made, where appropriate, for limiting the radius of curvature of the path to a predetermined minimum value.

The method may make provision in step a) for producing an about-turn command for the drone; and in step c), the travel of the drone along the curvilinear path is then ended when the measurements acquired in step b) indicate that the drone has turned through 180° about its yaw axis.

The invention also provides software, downloadable in part into a digital memory of a rotary wing drone and in part into a digital memory of a remote control appliance, the software including instructions that, on being executed, implement a method as defined above for piloting the drone to turn along a curvilinear path.

BRIEF DESCRIPTION OF THE DRAWINGS

There follows a description of an implementation of the method of the invention given with reference to the accompanying figures in which the same numerical references are used from one figure to another to designate elements that are identical or functionally similar.

FIG. 1 is an overall view showing the drone and the associated remote control enabling it to be piloted from a distance.

FIGS. 2a and 2b shows the movements of the drone that can be controlled by pivoting movements respectively about its yaw axis and about its pitching and roll axes.

FIG. 3 is a diagram showing the path followed by the drone when performing a circular turning movement corresponding to the combined yaw mode of piloting of the invention.

MORE DETAILED DESCRIPTION

Figure 4:
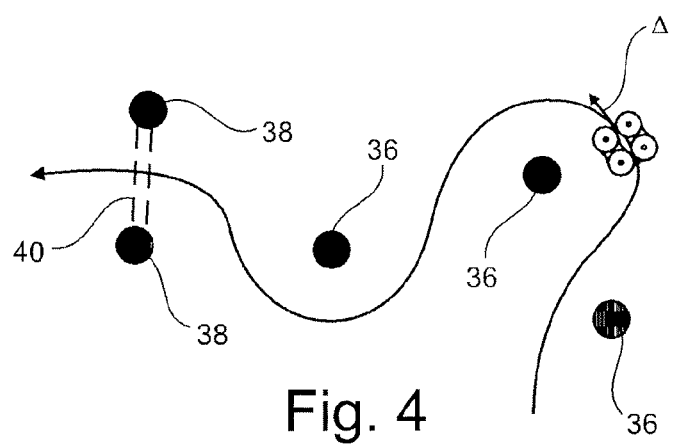
FIG. 4 is a diagram of an example of a race track that is easy to negotiate when the combined yaw mode of piloting is activated.

There follows a description of an implementation of the invention.

In FIG. 1, reference 10 is a general reference for a drone, which drone may for example be a quadricopter such as the model AR Drone from Parrot SA, Paris, France, as described in the above-mentioned WO 2010/061099 A2 and also in WO 2009/109711 A2 (which describes an example of an automatic stabilizer system operating on the basis of information supplied by an altimeter and a forward-looking camera) and FR 2 915 565 A1 (which describes in particular a gyro and accelerometer control system used by the drone).

The drone 10 has four coplanar rotors 12 driven by motors that are controlled independently by an integrated navigation and attitude control system. It is provided with a forward-looking, first camera 14 for obtaining an image of the scene towards which the drone is heading, e.g. a wide-angle CMOS sensor camera of VGA resolution (640×480 pixels) with a video stream refresh frequency of 15 frames per second (fps). The drone also has a vertically-directed, second camera (not shown) looking downwards, suitable for picking up successive images of the overflown terrain and used in particular for evaluating the velocity of the drone relative to the ground.

Inertial sensors (accelerometers and gyros) serve to measure with a certain amount of accuracy the angular velocities and the attitude angles of the drone, i.e. the Euler angles that describe the inclination of the drone relative to an absolute terrestrial frame of reference. In general, the term "inclination" is used to mean the inclination of the drone relative to a horizontal plane of a stationary terrestrial frame of reference, it being understood that the longitudinal and transverse components of the horizontal velocity of the drone are intimately associated with the respective angles of inclination about the pitching and roll axes of the drone.

An ultrasound telemeter located under the drone also provides a measurement of altitude relative to the ground.

Concerning the linear velocity in a horizontal plane (velocity of the drone in translation represented by the two above-mentioned longitudinal and transverse orthogonal components taken in a horizontal plane of a terrestrial frame of reference), this velocity is evaluated by analyzing the image delivered by the vertically-directed camera of the drone in combination with the accelerometer data, by means of software that estimates the movement of the scene picked up by the camera from one image to the next and applies to this estimated movement a scale factor that is a function of the measured altitude. Various algorithms enable this horizontal velocity to be determined in real time with very good accuracy, both for values that are close to the maximum speed of the drone, which is of the order of 10 meters per second (m/s), and for values that are very small.

The drone 10 is piloted by means of a remote control appliance 16 having a touch screen 18 that displays the image picked up by the front camera 14, together with various symbols superposed thereon for enabling piloting controls to be activated merely by a user making contact with a digit 20 on the touch screen 18. For this purpose, the appliance 16 is provided with radio means for connection with the drone and enabling data to be exchanged bidirectionally from the drone 10 to the appliance 16, in particular for transmitting the image picked up by the camera 14, and from the appliance 16 to the drone 10 in order to send piloting commands. By way of example, this radio connection may be of the WiFi (IEEE 802.11) or Bluetooth (registered trademarks) local network type. The remote control appliance 16 is also provided with inclination sensors enabling the attitude of the drone about roll and pitching axes to be controlled by imparting corresponding angles of inclination to the appliance (reference may be made to above-mentioned WO 2010/061099 A2 for further details on these aspects of the system).

As mentioned in the introduction, the remote control appliance 16 is advantageously constituted by a touch screen multimedia player or telephone that incorporates an accelerometer, e.g. a cell phone of the iPhone type, a player of the iPod Touch type, or a multimedia tablet of the iPad type, all of which are appliances that incorporate the various control members needed for displaying and detecting piloting commands, for viewing the image picked up by the front camera, and for bidirectional data exchange with the drone over a WiFi or Bluetooth connection.

Piloting the drone 10 then consists in maneuvering it by:
a) pivoting about a pitching axis 22 in order to move forwards or backwards (movement referenced X in FIG. 2b); and/or
b) pivoting about a roll axis 24 in order to shift to the right or to the left (movement referenced Y in FIG. 2b); and/or
c) turning about a yaw axis 26 in order to steer the main axis of the drone, i.e. the direction Δ in which the front camera points, to the right or to the left (movement shown in FIG. 2a); and/or
d) moving downwards or upwards in translation 28 or 30 by changing the throttle setting so as to reduce or increase respectively the altitude of the drone.

When piloting commands are applied directly by the user via the remote control appliance 16, commands a) and b) for pivoting about the pitching and roll axes 22 and 24 are obtained intuitively by varying the inclination of the appliance 16 respectively about its longitudinal axis 32 and its transverse axis 34: for example, in order to cause the drone to move forwards, it suffices to incline the appliance forwards by tilting it about the axis 32, and to shift to the right it suffices to incline the appliance by tilting it to the right about the axis 34, etc.

The commands c) and d) are the result of actions applied by the user making contact with a digit 20 (generally a right finger) on corresponding specific zones of the touch screen 18.

The drone also possesses an automatic and self-contained system for stabilizing hovering flight, corresponding to an autopilot mode that is activated in particular whenever the user removes the finger from the touch screen of the appliance, or automatically at the end of a takeoff stage, or indeed in the event of the radio connection between the appliance and the drone being interrupted. The drone then takes on a hovering state in which it is stationary and it is held in this stationary position by the autopilot and stabilizer system, without any intervention by the user.

The method of the invention consists in finding a controlled mode of piloting that makes it possible to go:

from conventional piloting using combined or separate commands selected from the various commands explained above—thus imposing three degrees of freedom (assuming that altitude remains constant) corresponding to movements in turning and in X and Y translation as shown in FIGS. 2a and 2b);

to piloting in a mode that is referred to herein as "combined yaw mode" which consists in making the drone maneuver in the manner shown in FIG. 3 so as to turn following a circular path C of radius R about a center of with a determined (constant or otherwise) curvilinear velocity and with a constant altitude.

In a simplified version, the curvilinear speed is constant, i.e. the user has only one degree of freedom to control, referred to as the "rate of turn", which parameter is associated essentially with the greater or smaller radius of the circular path. In a more complete version, the user is also enabled to control the speed at which the drone travels along the circular path, i.e. the user is given a second degree of freedom.

Combined yaw mode piloting is particularly suitable for sinuous paths such as the path of the imposed circuit shown in FIG. 4, in which the drone needs to perform a succession of fast right and left turns, so as to slalom along a track defined by single or double gates 36 or 38 to a finish line 40, and to do so at the greatest possible speed.

Figure 5:
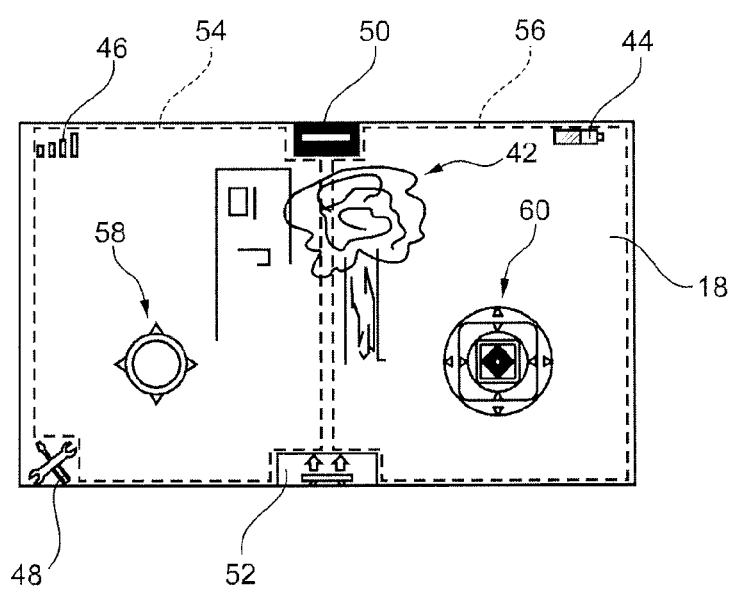
FIG. 5 is an example showing the various images and symbols that can be displayed on the screen of the remote control appliance.

FIG. 5 shows the various images and symbols that are displayed on the screen 18 of the remote control appliance.

The screen 18 reproduces the scene 42 picked up by the front camera 14 of the drone, with a certain number of symbols 44 to 60 being displayed in superposition on the image, the symbols providing information about the operation of the drone and enabling the user to initiate and send piloting control signals by touch activation.

Thus, the appliance displays information at 44 concerning the battery state of the drone, at 46 concerning the strength of the signal making the connection between the appliance and the drone, and at 48 concerning access to a settings menu. The screen also displays an emergency landing control 50 and an automatic takeoff control 52.

So far as the user is concerned, some of the piloting controls are available to the right hand and others to the left hand. In the example shown, a finger of the right hand is used for yaw control and for up/down control, and the thumb of the left hand is used for controlling pivoting in pitching and in roll. For this purpose, the screen is subdivided into two zones 54 and 56 each for implementing respective controls, and a corresponding icon 58, 60 appears in each of these zones. The icon 58 appears when the user places a left thumb on the zone 54 and uses it to control the angle of inclination of the drone about its pitching and roll axes by causing the casing of the remote control appliance to take up a corresponding angle of inclination while the left thumb remains in place, thereby enabling the drone to perform X or Y movements in translation as shown in FIG. 2b.

The icon 60 is displayed when the user places a right finger on the zone 56, and it serves to control pivoting about the yaw axis (movement shown in FIG. 2a) by moving the right finger over the screen to the right or the left, and in similar manner it serves to control up/down movements by moving the same finger up or down on the screen.

The user can thus pilot the drone in the above-explained manner by means of separate controls, applying a right finger on the right-hand half of the screen (pivoting about the yaw axis, and throttle control), or a left thumb on the left-hand half of the screen (moving in X or Y translation).

When both digits (thumb and finger) are taken off the screen, the automatic piloting system of the drone is immediately activated in order to cause the drone to take up a stationary position and remain stationary in that position.

In a manner characteristic of the invention, a new mode of piloting, referred to as "combined yaw mode" is made available to the user when the user places two digits simultaneously on the two respective zones 54 and 56.

In this new mode of piloting, when the user tilts the appliance to the left, the drone will turn about an imaginary point while following a circular path (as shown in FIG. 3), with the drone banking while it turns like a motorbike.

The more the user tilts the appliance, the tighter the turn, i.e. the smaller its radius of curvature: thus, the greater the tilt to the left, the tighter the turn and the drone will bank more into the turn in order to compensate for centrifugal force, so that the drone turns faster without side-slip or oversteer; conversely, if the user tilts the appliance to the right, the drone will turn to the right about an imaginary point, with the turn being tighter and its speed being greater when the appliance is tilted further to the right.

On the right digit being released, the drone returns to XY piloting with all of the controls being separate. Similarly, on releasing the left digit, it is possible to return to specific control over altitude and yaw movement.

If both digits are released, then in any event the drone will take up a stationary point.

It can be seen that with this combined yaw mode of piloting, the user need only control a single degree of freedom (tilting to a greater or lesser extent to the right and to the left), thereby making it very easy and intuitive to follow the path.

In a variant, still in this combined yaw mode of piloting, it is also possible to give the user control over the speed of the drone by tilting the appliance forwards (to accelerate) or backwards (to slow down).

That does indeed give an extra degree of freedom, but under all circumstances, it continues to be much easier to make the turns and to string them quickly one after another, etc., compared with a traditional mode of piloting using controls that are separate.

The piloting software of the drone serves to control the various motors automatically so as to provide simultaneous control over roll, yaw, and pitching movements on the basis of a single rate of turn setpoint given by the user (i.e. tighter or gentler turn), possibly in association with action to accelerate or to decelerate.

The altitude of the drone above the ground is also stored when beginning a turn, and correcting actions are taken to maintain this altitude, should that be necessary, i.e. the system guarantees that, regardless of any disturbances, the turn will be carried out at constant altitude.

On entering a combined yaw mode of piloting, the system thus freezes as many parameters as possible (speed, altitude), thereby enabling the user to concentrate on controlling the only parameter that is of great importance, i.e. the rate of turn.

There follows an explanation of how this combined yaw mode of piloting is implemented by the system of the invention.

Figure 6:
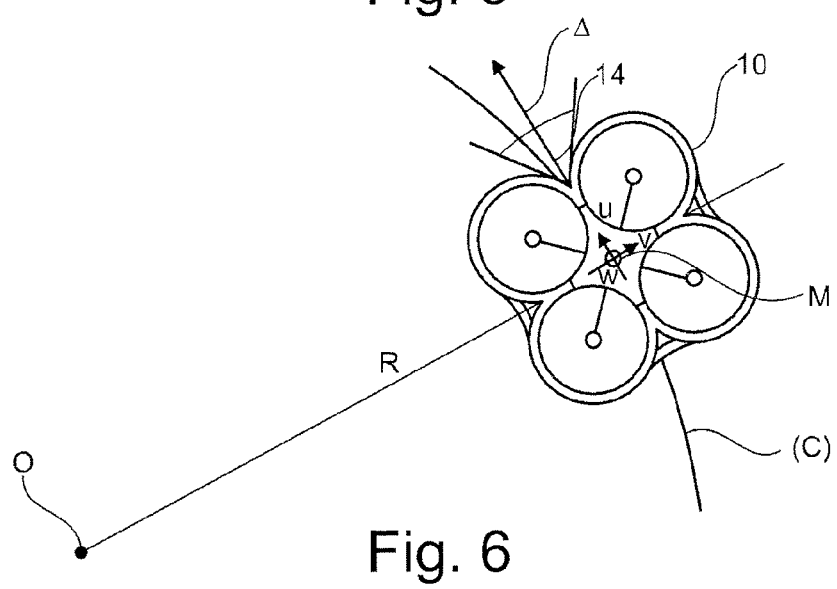
FIG. 6 is a plan view showing the various reference axes of the drone during a circular movement corresponding to piloting in combined yaw mode.

As shown in FIG. 6, the drone is to be put on and maintained on a turning path that describes a circle C of radius R so as to turn uniformly about the center O. The tangential speed u must therefore be constant, the radial speed v must be zero, and the rate of climb w must also be zero.

Figure 7:
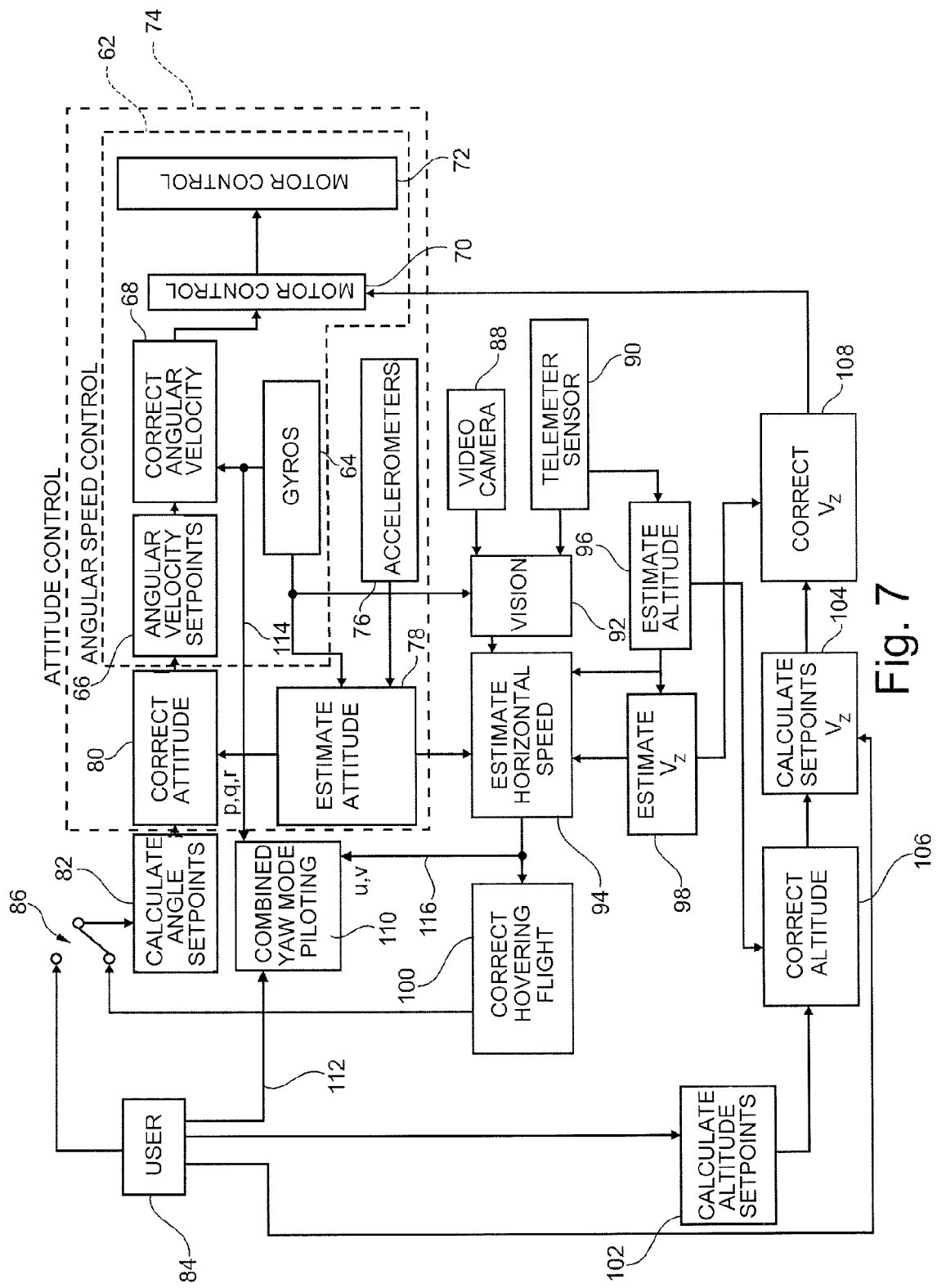
FIG. 7 is a block diagram showing the various control, servo-control, and assisted piloting members of the drone.

FIG. 7 is a block diagram of the various control and servo-control members and the autopilot of the drone. Nevertheless, it should be observed that although this diagram is shown in the form of interconnected circuits, the various functions are essentially implemented in software, with this representation merely being for illustrative purposes.

The piloting system requires several nested loops for controlling the angular velocity and the attitude of the drone, and for stabilizing hovering flight, in addition to controlling changes of altitude automatically or in response to a command from the user.

The innermost loop, which is the loop 62 controlling angular velocity, makes use firstly of signals provided by the gyro 64 and secondly of a reference constituted by the angular velocity setpoints 66, this data being applied as inputs to a stage 68 for correcting angular velocity. This stage 68 controls a stage 70 for controlling the motors 72 so as to control the speed of each of the motors separately in order to correct the angular velocity of the drone by the combined action of the rotors driven by these motors.

The angular speed control loop 62 is nested in an attitude control loop 74, which operates on the basis of information provided by the gyros 64 and by the accelerometers 76, this data being applied as input to an attitude estimator stage 78 having its outlet applied to an attitude correction stage 80 of the proportional integral (PI) type. The stage 80 delivers angular speed setpoints to the stage 66, which setpoints are also a function of the angle setpoints generated by a circuit 82 on the basis either of data generated internally by the autopilot of the drone, or of commands applied directly by the user 84, with the selection of one or the other of these possibilities being represented diagrammatically by a switch 86.

To summarize, starting from an error between the setpoint (as applied by the user or else as generated internally when using an autopilot) and the angle of measurement given by the attitude estimator circuit 78, the attitude control loop 74 (circuits 64 to 80) calculates an angular velocity setpoint using the PI corrector of the circuit 80. The angular velocity control loop 62 (circuits 64 to 72) then calculates the difference between the preceding angular velocity setpoint and the angular velocity as actually measured by the gyros 64. The loop uses this information to calculate the various rotary speed setpoints to be applied to the motors 72 of the drone (thereby determining the upward force) in order to implement the maneuver initially requested by the user, or else planned by the autopilot.

In autopilot operation, the setpoints applied by the user are replaced by signals that are generally internally. The vertical video camera 88 and the telemetry sensor 90 acting as an altimeter produce information that is applied to a processor circuit 92 that also receives data from the gyros 64 in order to apply the necessary corrections to the estimated horizontal speed, as given by the circuit 94. This horizontal speed estimate may be corrected by an estimate of vertical speed, given by the circuit 98 on the basis of an altitude estimation given by the circuit 96 that receives information from the telemetry sensor 90.

For hovering flight, the horizontal speed estimated by the circuit 94 enables the circuit 100 to calculate speed setpoints that are then applied as input to the attitude control loop after being transformed into angle setpoints by the circuit 82 in order to bring the drone to zero speed or to keep it in a configuration in which its speed and angle of inclination are both zero.

For vertical movement of the drone, the user 84 applies either a rate of climb setpoint $V_z$ that is applied directly to a circuit 104, or else an altitude setpoint that is applied to a circuit 102 that uses the altitude estimated produced by the circuit 96 to calculate a rate of climb setpoint by using the circuit 106.

Either way, the rate of climb (as requested or as calculated) is applied to a circuit 108 that compares the rate of climb setpoint $V_z$ with the corresponding estimated rate of climb as given by the circuit 98, and it modifies accordingly the control data applied to the motors (circuit 70) so as to increase or decrease the speed of rotation simultaneously on all of the motors in order to minimize the difference between the setpoint rate of climb and the measured rate of climb.

In a manner characteristic of the invention, in order to make an automatic combined yaw mode of piloting possible, an additional functional block 110 may be activated by a user command 112, e.g. as a result of pressing two digits simultaneously on the screen of the appliance. This circuit 110 controls the circuit 82 for calculating angle setpoints on the basis of angular speed parameters p, q, and r (114) (given by the gyros 64) and on the basis of horizontal speed parameters u and v (116) (as estimated by the circuit 94).

There follows an explanation of how the drone-controlling setpoints are generated during this stage of combined yaw mode piloting.

The speed data for the drone is given in the u, v, w frame of reference as shown in FIG. 6, i.e. in a frame of reference associated with the body of the drone.

The following notation is used:
u and v are the components of velocity in horizontal translation (u in the main forward direction Δ of the drone, and v in the transverse direction), and w is the velocity in vertical translation, with these velocities all being in a frame of reference associated with the drone (and thus independent of its angle of inclination relative to the terrestrial frame of reference);

p, q, and r are the angular velocities about three axes, respectively the pitching axis 22, the roll axis 24, and the yaw axis 26 (FIG. 1); and ϕ, θ, and ψ are the Euler angles of the drone defining its orientation relative to a (inertial) terrestrial frame of reference, ϕ and θ being the two angles that define inclination relative to the horizontal.

Each of the four propellers i of the drone (i=1, ..., 4) exerts a torque $\Gamma_i$ and an upward thrust force $F_i$ proportional to the square of the speed of rotation $\omega_i$ of the motor:

$$\begin{cases} F_i = a\omega_i^2 \\ \Gamma_i = b\omega_i^2 \end{cases}$$

It should be recalled that the fundamental relationships of dynamics as projected into the moving frame of reference of the drone give the following three equations:

$$\dot{u} = (rv - qw) - g\sin\theta - C_x u$$

$$\dot{v} = (pw - ru) + g\sin\varphi\cos\theta + C_y v$$

$$\dot{w} = (qu - pv) + g\cos\varphi\cos\theta - \frac{1}{m}\sum_{i=1}^{4} a\omega_i^2$$

(Equations 1-3)

where:

g is the acceleration due to gravity;

$C_x$ and $C_y$ are coefficients for resistance to advancing (representing the friction forces to which the drone is subjected) along the two horizontal axes;

a is a coefficient associating thrust and rate of climb with the speed of rotation $\omega$; and m is the mass of the drone.

The dynamic moment theorem is applied in the same manner to the system, still in projection into the moving frame of reference, thereby giving the following three equations:

$$I_x\dot{p} + qr(I_z - I_y) = Ia(\omega_2^2 - \omega_4^2)$$

$$I_y\dot{q} + pr(I_x - I_z) = Ia(\omega_1^2 - \omega_3^2)$$

$$I_z\dot{r} + pq(I_y - I_x) = b(\omega_1^2 - \omega_2^2 + \omega_3^2 - \omega_4^2)$$

(Equations 4-6)

where:

$I_x$, $I_y$, and $I_z$ are parameters representing the moments of inertia of the drone about the three axes and l is the distance between the motor and the center of gravity M.

In these equations, the first term of the left-hand side corresponds to the dynamic moment of the system, the second term represents the contribution to the dynamic moment of Coriolis forces, and the right-hand member corresponds to the moments exerted by the upward forces $F_i$ and the torques $\Gamma_i$ created by the propellers of each of the rotors.

Finally, the following relationships can be derived by making use of the three Euler angles $\phi$, $\theta$, and $\psi$:

$$\dot{\varphi} = p + (q\sin\varphi + r\cos\varphi)\tan\theta$$

$$\dot{\theta} = q\cos\varphi - r\sin\varphi$$

$$\dot{\psi} = \frac{q\sin\varphi + r\cos\varphi}{\cos\theta}$$

(Equations 7-9)

The behavior of the system is thus fully described by nine equations in nine unknowns (above Equations 1-9).

There follows a more precise explanation of how the circuit generates the piloting setpoints in order to implement a combined yaw turning movement.

As stated above, the user may apply the following commands:

a command by inclining the device to one side, to the right or the left, interpreted as a "rate of turn" command, with the turn to be performed by the drone being tighter for a steeper angle of inclination; and (optionally) a command obtained by tilting the device forwards or rearwards, interpreted as a command for increasing or reducing the speed of the drone (tangential speed relative to the circle described by the drone in a turn).

Consideration is given to an elementary time interval of duration that is sufficiently short for the rate of turn and/or speed commands to be considered as being constant (non-varying setpoint values).

In a combined yaw turn, the arc of the path described by the drone during this elementary time interval may be considered as being a fraction of a circle C of radius R about an imaginary center of (FIG. 6), the circle being situated in a plane parallel to the plane of the ground and the path being described at constant speed. The movement of the drone is thus a uniform circular turning movement.

The following two conventional equations are used, that can easily be derived for this type of movement:

$$u_{plan} = \dot{\psi} * R$$

$$a_{y_{plan}} = \frac{v_{plan}^2}{R}$$

(Equations 10-11)

where:

$u_{plan}$ the tangential speed;

$a_{y_{plan}}$ is the radial acceleration;

$\dot{\psi}$ is the angular velocity or rate of turn (i.e. the piloting setpoint given by the user by tilting the remote control appliance to the left or the right);

R is the radius of the circle described by the drone performing a uniform circular movement; and $v_{plan}$ the radial velocity.

In order to define the movement of the drone in the turn, consideration is given to an inertial frame of reference R centered at O, and to a non-Inertial frame of reference R' centered at M (the center of gravity of the drone) and performing rotation about R that is given by the following vector:

$$\vec{\Omega}_{\left(\frac{R'}{R}\right)}.$$

The drone may be considered as being a moving point M of mass m that is subjected to the forces of the resultant $\vec{F}$.

Writing the acceleration of M in (R) as $\vec{a}_a$, the acceleration of M in (R') as $\vec{a}_r$, the driving acceleration as $\vec{a}_e$, and finally the Coriolis acceleration as $\vec{a}_c$, then, by vector addition:

$$\vec{a}_a = \vec{a}_r + \vec{a}_e + \vec{a}_c$$

If the inertial driving force, i.e. centrifugal force in the present situation, is written $\vec{F}_{ie} = -m*\vec{a}_e$, then in general terms the following applies:

$$\vec{F}_{ie} = -m*\vec{a}_e = -m*\left[\overrightarrow{a(O)}_{(R)} + \left(\frac{d\vec{\Omega}_{\left(\frac{R'}{R}\right)}}{dt}\right)_{(R)} + \vec{\Omega}_{\left(\frac{R'}{R}\right)} \wedge \left(\vec{\Omega}_{\left(\frac{R'}{R}\right)} \wedge \overrightarrow{OM}\right)\right]$$

For a uniform circular rotary movement $$\vec{\Omega}_{\left(\frac{R'}{R}\right)} = \text{constant}$$

(uniform rotation) and for $\vec{a(O)}_{(R)} = \vec{0}$, the following applies:

$$\left(\frac{d\vec{\Omega}_{\left(\frac{R'}{R}\right)}}{dt}\right)_{(R)} = \vec{0}$$

The inertial driving force $\vec{F}_{ie}$ is obtained by calculation (on a circular path, the inertial driving force tends to move the drone away from its path):

$$\vec{F}_{ie} = -m*\Omega^2 * \vec{OM}$$

As seen above (Equation 2) the following applies:

$$\dot{v} = (pw-ru) - g \sin\phi \cos\theta + Cyv$$

Two assumptions are made at this stage:
1) the drone is moving in a plane, and thus w=0; and
2) θ<30°: furthermore since the pair (θ,φ) saturates at the maximum angle value in the turn, in practice θ<20°. It is thus possible to use the small-angle approximation, i.e. cos θ=1 and sin φ=φ.

The simplified equation in the frame of reference of the drone then becomes:

$$\dot{v} = (-r*u) + g*\phi + Cyv$$

This is projected into the plane of the turn, using the following matrix to go from the body frame of reference (reference R' of the drone body) to the world frame of reference (projection into a frame of reference R" parallel to R' but with a different orientation):

$$R^{world}_{body} = \begin{bmatrix} \cos(\theta) & \sin(\theta)\cos(\varphi) & \sin(\theta)\cos(\varphi) & 0 \\ 0 & \cos(\varphi) & -\sin(\varphi) & 0 \\ -\sin(\theta) & \cos(\theta)\sin(\varphi) & \cos(\theta)\cos(\varphi) & 0 \\ 0 & 0 & 0 & 1 \end{bmatrix}$$

The equation is simplified in the conditions of the turn and then projected into the plane of the turn, giving:

$$a_{y_{plan}} = \cos\phi * \dot{v}_b$$

$$v_{plan} = \cos\phi * v_b$$

$$u_{plan} = \cos\theta * u_b$$

$$a_{y_{plan}} = (-r*u_{plan}) + g*\phi + Cy'*v_{plan}$$

It is desired that the radial velocity $v_{plan}$ should be zero in the turn, giving rise to the following final equation that is used for control purposes:

$$a_{y_{plan}} = (-r*u_{plan}) + g*\phi \quad \text{(Equation 12)}$$

This relationship gives the acceleration to which the drone is subjected in the plane of the turn—acceleration that it is desired to cancel—, the first term corresponding to the inertial driving force and the second term relating to the projection of the force of gravity into the appropriate frame of reference.

For the desired movement, it is known that:

$$a_{y\_plan} = -\frac{u^2_{plan}}{R}$$

The magnitude on which action is taken (the piloting setpoint value) is the roll angle φ of the drone.

In above equation 12 it can be seen that it is possible, by acting on this angle, to set the value of the acceleration of the drone in the plane of the turn to this reference value. φ is thus calculated directly as follows:

$$\varphi = \frac{1}{g}\left(-\frac{u^2_{plan}}{R} + r*u_{plan}\right) \quad \text{(Equation 13)}$$

In order to obtain the desired turn, the roll angle is calculated in application of Equation 13 on the basis of data delivered by the sensors of the drone.

The inclinations applied by the user to the remote control appliance are interpreted and converted into corresponding piloting setpoints.

On a path of uniform circular movement about a stationary center, the following applies:

$$V = \dot{\psi} * R$$

where:
V: tangential speed (depending on the forward/backward inclination of the appliance);
$\dot{\psi}$: angular velocity or rate of turn (depending on the left/right inclination of the appliance); and
R: radius of the circle.

The rate of turn command given by the user (left/right inclination) is converted into an angular velocity command for turning about the axis in application of equation 13. In order to determine the radius r, equation 9 gives:

$$\dot{\psi} = \frac{q\sin\varphi + r\cos\varphi}{\cos\theta} \cong \frac{r*\cos\varphi}{\cos\theta}$$

i.e.:

$$r \cong \frac{\dot{\psi}*\cos\theta}{\cos\varphi} \quad \text{(Equation 14)}$$

The speed command (forward/backward inclination) is converted directly into a forward speed setpoint for the drone.

Using these two commands, the user imposes the rate of turn of the drone and its forward speed. The radius of the turn is determined by Equation 14, and the computer of the drone determines the pitching, roll, and yaw angles for the drone that satisfy those two commands.

Specifically, the radius of the turn, which is a function of the tangential speed of the drone and of its rate of turn, is determined for each sampling period with the value of the rate of turn command saturating about the axis so that the drone cannot describe a circle having a radius smaller than some minimum value (in practice 70 centimeters (cm)).

Advantageously, it is possible to provide an additional combined yaw function enabling the drone to perform a complete about-turn in response to a specific command applied by the user. The speed and the altitude at the moment the command is applied are conserved, with the rate of turn being set for example to the minimum acceptable radius given the speed of the drone, and the maneuver comes to an end once the drone has turned through 180° relative to its initial orientation (i.e. the orientation it had at the instant the maneuver was triggered).

In the example described, it should be observed that the rate of turn command for application to the drone is calculated directly by the drone computer, with the remote control appliance transmitting no more than an angle of inclination that is greater or smaller. Nevertheless, it is equally possible for the calculation to be performed by the drone or by the remote control appliance.

What is claimed is:

1. A method of piloting a rotary wing drone (10), the method comprising the following steps:
   a) a remote control appliance (16) producing a turning command to follow a curvilinear path;
   b) the drone both i) receiving said command and ii) acquiring instantaneous measurements of the linear velocity components, of the angles of inclination, and of the angular velocities of the drone; and
   c) on the basis of the received command and of the measurements acquired in step b), generating setpoint values for a drone control loop (64-80), these setpoint values controlling the horizontal linear speed and the inclination of the drone relative to a frame of reference associated with the ground so as to make the drone follow said curvilinear path (C) with a predetermined tangential speed (u), wherein:
      the drone is a drone of the quadricopter type having multiple rotors driven by respective motors (72);
      the control loop (64-80) controls the horizontal linear speed and the inclination of the drone by taking different actions on the speeds of rotation of said motors (72); and
      said command is a rate of turn command comprising a right or left turn direction parameter and a parameter defining a setpoint for the instantaneous radius of curvature of the turn.

2. The method of claim 1, wherein said curvilinear path (C) is a circular path, followed with a constant radius of curvature (R).

3. The method of claim 1, wherein said predetermined tangential speed (u) is a constant speed.

4. The method of claim 1, wherein the setpoint values generated in step c) control the motors of the drone in such a manner as to ensure that the altitude of the drone is also kept constant relative to the ground.

5. The method of claim 1, wherein the setpoint values generated in step c) control the horizontal linear speed and the inclination of the drone in such a manner as to also maintain the drone at a zero radial speed (v) relative to the circular path, so as to compensate for any side-slip or oversteer of the drone as it follows said path.

6. The method of claim 1, wherein, in step a), the command for turning along a curvilinear path is produced by said remote control appliance (16), which appliance comprises:
   a touch screen (18);
   means suitable for i) detecting contact of at least one digit (20) of a user on the surface of the screen, ii) determining the position of the point(s) of contact, and iii) producing corresponding piloting commands including said command to turn along a curvilinear path; and
   wireless data transmission means suitable for transmitting commands to the drone.

7. The method of claim 6, wherein the command to turn along a curvilinear path is triggered on detecting simultaneous contact of two of the user's digits on the touch screen.

8. The method of claim 7, wherein said command to turn along a curvilinear path is produced throughout the duration of said simultaneous contact of two digits, and until loss of this simultaneous contact is detected.

9. The method of claim 6, wherein the remote control appliance further includes a detector of inclinations about at least one of its pitching and roll axes (32, 34), and the command for turning along a curvilinear path is produced i) as a function of the left or right direction of the inclination of the appliance relative to its roll axis (34) in order to determine said left or right turn direction parameter, and ii) as a function of the amplitude of the inclination of the appliance relative to said roll axis (34) in order to determine said parameter defining the radius of curvature (R) of the turn.

10. The method of claim 9, wherein the turn command is also produced as a function of the amplitude of the inclination of the appliance relative to its pitching axis (32), in order to determine a tangential speed parameter (u).

11. The method of claim 1, wherein, if the path followed during a command to turn along a curvilinear path includes a radial velocity component (v), then the turn command is also produced as a function of the amplitude of the inclination of the drone relative to its pitching axis so as to cancel said radial velocity component.

12. The method of claim 1, further including, where appropriate, limiting the radius of curvature (R) of the path to a predetermined minimum value.

13. The method of claim 1, further including, in step a), producing an about-turn command for the drone, and in step c), the travel of the drone along the curvilinear path is ended when the measurements acquired in step b) indicate that the drone has turned through 180° about its yaw axis.

* * * * *